United States Patent

Kawada et al.

[11] Patent Number: 5,803,221
[45] Date of Patent: Sep. 8, 1998

[54] VISCOUS FLUID CLUTCH

[75] Inventors: Shinichi Kawada; Kenji Ohhara, both of Atsugi; Hirofumi Katoh, Kiyokawa; Yasuo Fujita, Atsugi, all of Japan

[73] Assignee: Unisia Jecs Corporation, Atsugi, Japan

[21] Appl. No.: 739,834

[22] Filed: Oct. 30, 1996

[30] Foreign Application Priority Data

Oct. 30, 1995 [JP] Japan .................................. 7-281766

[51] Int. Cl.⁶ ................................................ F16D 35/02
[52] U.S. Cl. ..................................... 192/58.7; 192/58.682
[58] Field of Search ............................... 192/58.4, 58.5, 192/58.6, 58.68, 58.681, 58.682, 58.7, 82 T

[56] References Cited

U.S. PATENT DOCUMENTS

| | | | |
|---|---|---|---|
| 3,990,556 | 11/1976 | Hayashi et al. | 192/58 |
| 4,741,421 | 5/1988 | Johnston | 192/58.7 X |
| 4,903,805 | 2/1990 | Ono | 192/58 |
| 4,979,601 | 12/1990 | Hagiwara et al. | 192/58.7 |
| 5,452,782 | 9/1995 | Inoue | 192/58 |
| 5,497,868 | 3/1996 | Ohhara | 192/58.4 |
| 5,499,706 | 3/1996 | Kawada | 192/58.4 |
| 5,501,183 | 3/1996 | Takayama | 123/41.12 |

FOREIGN PATENT DOCUMENTS

| | | |
|---|---|---|
| 25 41 539 | 8/1976 | Germany . |
| 38 38 638 | 6/1989 | Germany . |
| 43 90 685 | 4/1994 | Germany . |
| 44 40 868 | 5/1995 | Germany . |
| 3-26839 | 3/1991 | Japan . |

*Primary Examiner*—Richard M. Lorence
*Attorney, Agent, or Firm*—Foley & Lardner

[57] ABSTRACT

A viscous fluid clutch includes a housing rotatably mounted to a drive shaft and a clutch plate attached to the drive shaft. These relatively rotatable members have a fluid shear space therebetween and cooperable with a fluid medium in the shear space to provide a shear-type fluid drive therebetween. The housing includes a reservoir, an operating chamber and a pump outlet opening communicating between the operating chamber and the reservoir. An annular wall is secured at its inner and outer peripheral edges to the clutch plate and includes an annular bend between the outer and inner peripheral edges to define an annular auxiliary reservoir in cooperation with the clutch plate. The housing has an annular recess accommodating the annular bend. The annular recess is defined by a cylindrical inner surface. This cylindrical inner surface and the opposed surface of the annular bend define therebetween an annular passage communicating with the operating chamber. A plurality of blades are arranged in this passage for urging viscous fluid to move toward the operating chamber out of the annular passage.

8 Claims, 5 Drawing Sheets

VISCOUS FLUID CLUTCH

BACKGROUND OF THE INVENTION

1. Field of the Invention

The present invention relates to a viscous fluid clutch adapted to drive an accessory device, such as a cooling fan, for an internal combustion engine.

2. Description of the Prior Art

Japanese Utility Model Application Second Publication No. 5-47866 discloses a viscous fluid clutch adapted to drive a cooling fan for an internal combustion engine. This viscous fluid clutch includes relatively rotatable first and second drive members having a fluid shear space therebetween and which are cooperable with viscous fluid in the shear space to provide a shear-type fluid drive therebetween. In the viscous fluid clutch, an auxiliary reservoir is provided in addition to a main reservoir for storing visous fluid in order to decrease the level of fluid at rest and to avoid dragging of the first drive member upon rotating the second drive member at cold engine.

Specifically, a housing is rotatably mounted to a drive shaft and a clutch plate is attached to the drive shaft. The housing includes a reservoir, an operating chamber and a pump outlet providing communication between the operating chamber and the reservoir. The clutch plate includes an annular projection defining an annular space serving as the auxiliary reservoir. The housing has an annular recess accommodating the annular projection. The annular recess is defined by a cylindrical inner surface extending around the opposed cylindrical surface of the annular projection. The cylindrical inner surface and the opposed cylindrical surface define therebetween an annular passage communicating with the operating chamber. The annular projection of the clutch plate is formed with radial orifices. During rotation of the drive shaft and thus the clutch plate upon start at cold engine, the viscous fluid is thrown radially outwardly from the auxiliary reservoir, owing to the centrifugal force, through the radial orifices into the annular passage. The viscous fluid tends to remain in the annular passage upon start of the engine.

An object of the present invention is to improve a viscous fluid clutch of the above kind such that viscous fluid is quickly discharged out of a passage surrounding an auxiliary reservoir toward an operating chamber.

SUMMARY OF THE INVENTION

A viscous fluid clutch according to the present invention comprises first and second relatively rotatable drive members and a fluid shear drive means. The first and second drive members are rotatable in a predetermined direction about an axis of rotation. The first drive member has an operating chamber and a reservoir. The fluid shear drive means is associated with the first and second drive members, located in the operating chamber and operable with viscous fluid, for providing a shear-type fluid drive between the first and second drive members.

The first drive member has a passage providing communication between the operating chamber and the reservoir. The second drive member has wall means defining an auxiliary reservoir. The first drive member and the auxiliary reservoir define opposed spaced surfaces defining therebetween an annular passage that communicates with the operating chamber.

The wall means has radial orifices that provide communication between the auxiliary reservoir and the annular passage. A plurality of blades are disposed in the annular passage. Each of the blades is angled with respect to the predetermined direction by a predetermined angle so that rotation of the second drive member in the predetermined direction causes the blades to urge viscous fluid out of the annular passage toward the operating chamber.

DETAILED DESCRIPTION OF THE INVENTION

Figure 1:
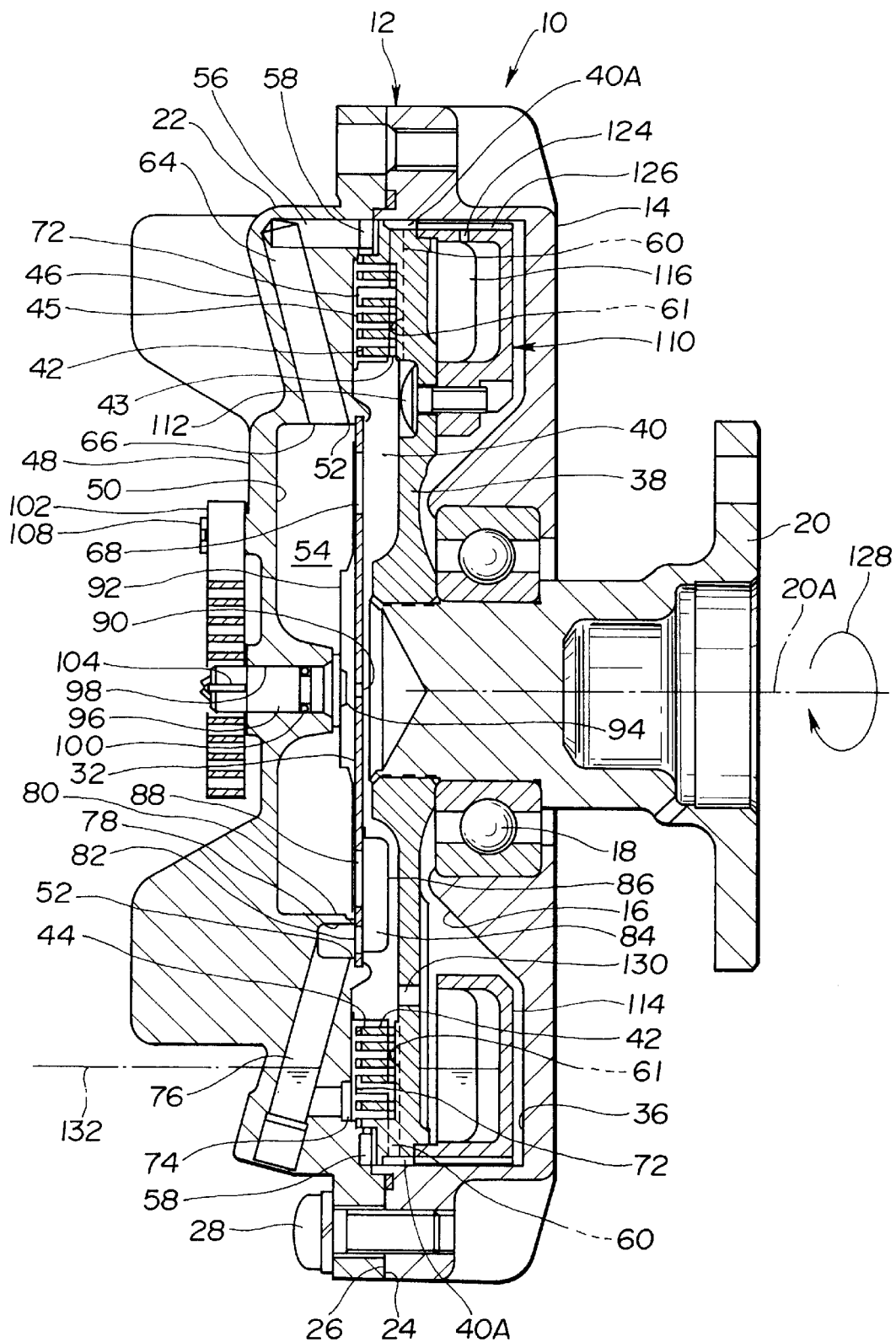
FIG. 1 is a cross-sectional view of a viscous fluid clutch embodying the present invention.

Referring to FIG. 1, a viscous fluid clutch 10, adapted to drive a cooling fan for an internal combustion engine, includes a housing 12 that includes a rear wall 14 having a hub 16 rotatably mounted by a suitable bearing 18 on a drive shaft 20. The housing 12 further includes a cover member or front wall 22 that has an annular flat surface 24 formed adjacent its peripheral edge, the latter being secured to an annular flat surface 26 of the rear wall 14 by a plurality of bolts 28. A partition plate or divider wall 32 is fixedly attached to the front wall 22 at a portion radially inward of the annular flat wall 24. A second annular recess 36 is formed in the rear wall 14 radially outward of the partition plate 32. A clutch plate 38 is secured at its center by any suitable means to the drive shaft 20. The outer peripheral portion of the clutch plate 38 is freely located in an operating chamber 40.

Adjacent portions of the clutch plate 38 and the front wall 22 are provided with torque transmitting elements consisting of cooperating annular ridge and groove elements 42 and 44, respectively, with an intervening fluid shear space therebetween to accommodate a viscous fluid as a torque-transmitting medium. The annular groove elements 44 are formed in the front wall 22 radially inward of the outer edge of the annular recess 36 in the rear wall 14 and outward of the outer edge of the partition plate 32 attached to the front wall 22.

Figure 3:
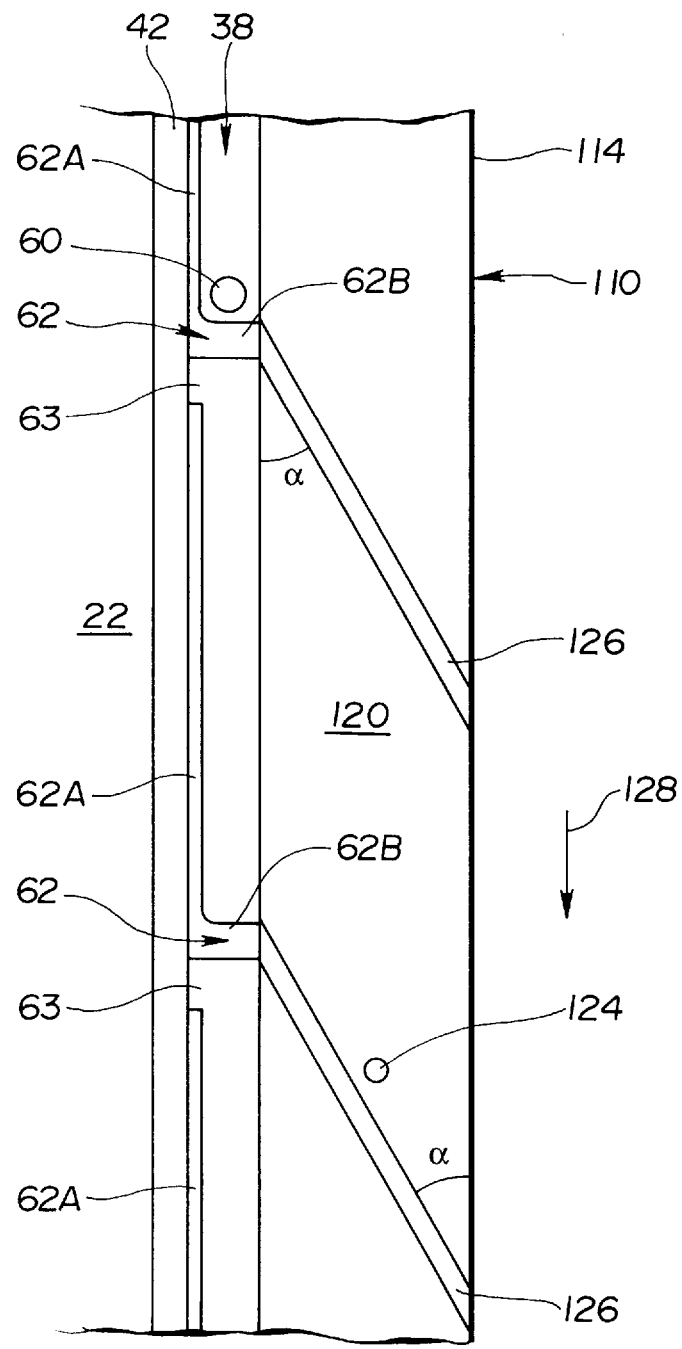
FIG. 3 is a fragmentary section through line 3—3 of FIG. 2.

It may be noted in FIG. 1 that the front wall 22 has an axial protrusion 46 that merges smoothly into a central portion 48 formed with a circular cavity 50, which has a circular peripheral edge 52 disposed radially inward of the outer periphery of the partition plate 32. A reservoir 54 is defined in the circular cavity 50 between the central portion 48 and the partition plate 32. A pump outlet passage 56 is formed in the axial protrusion 46 of the front wall 22 and comunicates at one end thereof with an annular groove 58 formed in the front wall 22 at a portion adjacent and radially inward of the annular flat surface 24. A plurality, four in this embodiment, of circumferentially distant pump inlet radial openings, only two being shown in broken lines at 60 in FIG. 1 and one being shown at 60 in FIG. 3, are formed in the outer peripheral surface of the clutch plate 38 and disposed adjacent the corresponding four of eight circumferentially equi-distant dam elements 62 (see FIG. 3) arranged on and integral with the outer peripheral surface of the clutch plate 38. As best seen in FIG. 3, each of the dam elements 62 includes a circumferential wall portion 62A and an axial wall portion 62B connected to and extending from one end of the circumferential wall portion 62A. The circumferential walls 62A of all of the dam elements 62 are arranged along that edge of the outer peripheral surface of the clutch plate 38, which is disposed in the neighborhood of the annular groove 58 such that each of the circumferential walls 62A is spaced from the adjacent one to define therebetween a discharge cutout 63. The discharge cutouts 63 defined between the adjacent two of the circumferential walls 62A are opposed to the annular groove 58 so as to facilitate passage of viscous fluid directed toward the annular groove 58 from the pump inlet openings 60.

The pump inlet openings 60 allow viscous fluid to pass therethrough when the fluid is thrown radially outwardly, owing to centrifuigal force during rotation of the drive shaft 20, from a central portion of the operating chamber 40 past the ridge and groove elements 42 and 44 toward an annular space portion 40A, defined between the peripheral surface of the clutch plate 38 and the adjacent inner cylindrical surface of the rear wall 14, of the operating chamber 40. The pump inlet openings 60 communicate with four cutouts 61, respectively, with which the clutch plate 38 is formed. These radially extending cutouts 61 are angularly displaced one after another and radially extend with respect to an axis 20A of rotation of the drive shaft 20 to allow passage of the fluid directed from the central portion of the operating chamber 40 toward the pump inlet openings 60. That portion of the front wall 22 formed with the annular groove elements 44 is formed with four cutouts 45 angularly displaced one after another and radially extends with respect to the axis 20A of rotation of the drive shaft 20 to allow passage of the fluid directed from the central portion of the operating chamber 40 toward the annular groove 58 past the annular groove elements 44. These four radially extending cutouts 45 are not opposed to the before mentioned four radially extending cutouts 61 and angularly displaced from the cutouts 61. The clutch plate 38 is formed with a plurality, eight in this embodiment, of slits 43 extending radially through root portions of the annular ridge elements 42. These slits 43 are angularly displaced, with respect to the axis 20A of rotation of the drive shaft 20, one after another such that every two of them is disposed between the adjacent two of the radially extending cutouts 61. With the radially extending cutouts 61, 45 and radially extending slits 43, shear spaces between the annular ridge and groove elements 44 are interconnected for fluid communication. The radially extending cutouts 45 are interconnected by an annular wide groove or passage 72 formed on the front wall 22 adjacent and radially inward of the radially outermost one of the annular grooves 40. It may be noted from FIG. 1 that there is no ridge element cooperating with this wide annular groove 72.

The pump outlet passage 56 communicates at the opposite end portion thereof with a return passage 64 formed in the axial protrusion 46 of the front wall 22. The return passage 64 terminates in an opening or return port 66 formed in the cylindrical wall of the circular cavity 50. Thus, the return port 66 communicates with the reservoir 54.

As shown in FIG. 1, an opening or inlet port 68 is formed in the partition plate 32, providing communication between the reservoir 54 and the central portion of the operating chamber 40 radially inward of the cooperating annular ridge and groove elements 42 and 44. A second opening or inlet port 74 is formed in the front wall 22. This second inlet port 74 is open to the annular groove 72, providing communication between the annular groove 72 and a radial supply passage 76 formed in the front wall 22. This radial supply passage 76 communicates with a small cavity 78 formed in a protrusion 80 that extends radially into the circular cavity 50 from the circular peripheral edge 52. An opening 82 is formed in the partition plate 32, providing communication between the small cavity 78 and a space 84 defined between the partition wall 32 and a cap-like plug 86. The plug 86 is secured at its peripheral edge to the partition plate 32 at a portion radially inward of the ridge and groove elements 42 and 44. An opening or port 88 is formed in the partition plate 32 adjacent and radially inward of the protrusion 80, providing communication between the space 84 and the reservoir 54. The partition plate 32 is formed with a center air vent opening 90.

The ports 68 and 88 are closed by a valve member 92. The valve member 92 is secured at a portion intermediate its radially remotest edges to a reduced diameter portion 94 of a center pin or shaft 96, which is rotatably mounted in a central opening 98 formed in the front wall 22. A seal ring 100 is mounted in an annular groove formed in the center pin 96 to prevent leakage therepast. A helically wound, bimetallic thermostatic valve control element 102 is provided with an inwardly extending end portion 104 mounted in a transverse slot formed in the center pin 96. An outwardly extending end portion of the bimetallic element 102 is secured to a post 108. With this arrangement, a change in an ambient temperature either winds or unwinds the bimetallic element 102, resulting in rotation of the center pin 96 and the valve member 92.

Figure 2:
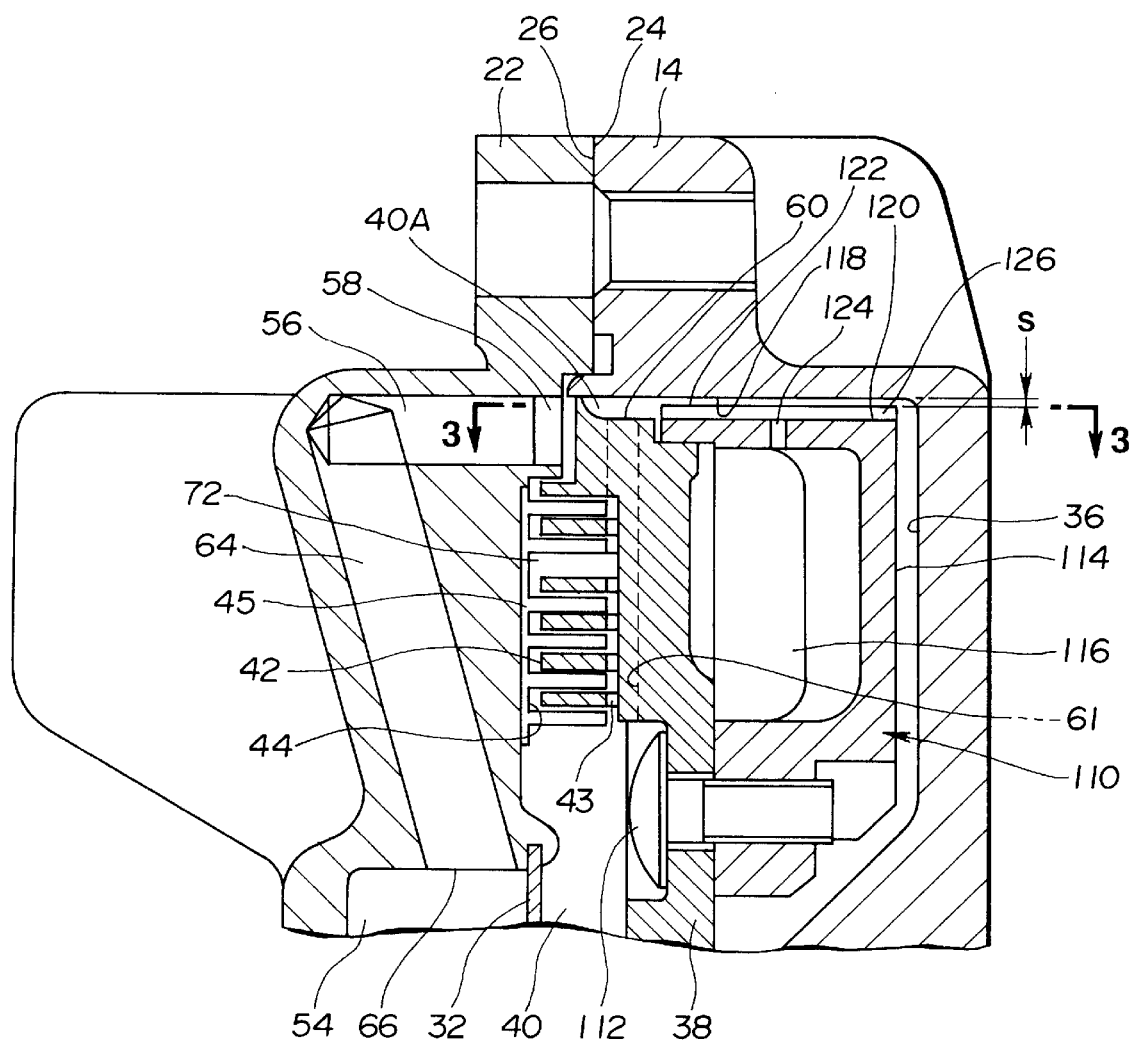
FIG. 2 is a fragmentary enlarged view of FIG. 1.

Referring also to FIG. 2, an annular wall 110 is secured, by suitable means such as by a plurality of fasteners 112, at its inner peripheral edge to the clutch plate 38 and includes an annular bend 114 between the outer and inner periphral edges thereof to define an annular second or auxiliary reservoir 116 in cooperation with the clutch plate 38. The annular bend 114 is freely located in a space formed by the annular recess 36 in the rear wall 14. The annular recess 36 accommodating the annular bend 114 is defined by a cylindrical inner surface 118 having the same radial distance from the axis 20A of rotation of the drive shaft 20. This cylindrical inner surface 118 and the opposed cylindrical radially outer surface 120 of the annular bend 114 define therebetween an annular passage 122 communicating with the annular space portion 40A radially outward of the ridge and groove elements 42 and 44. The annular bend 114 is formed with a plurality, four in this embodiment, radial orifices 124. During rotation of the drive shaft 20, the fluid thrown radially outwardly from the auxiliary reservoir 116, owing to the centrifugal force, flows through the radial orifices 124 into the annular passage 122.

In order to quickly discharge the fluid out of the annular passage 122, the annular bend 114 has a plurality, eight in this embodiment, blades 126 integrally formed on the cylindrical outer surface 120. The blades 126 are in the form of projections into the annular passage 122. The top or crest of each of the blades 126 are in spaced relation with the cylindrical inner surface 118 to provide a clearance S. As best seen in FIG. 3, the blades 126 are angled with respect to a direction of rotation, as indicated by an arrow 128, of the drive shaft 20 such that, during rotation of the drive shaft 20, the fluid on the cylindrical outer surface 120 of the annular bend 114 is forced to move toward the circumferential wall portions 62A of the dam elements 62 of the clutch plate 38. Each of the blades 126 has a trailing end, with respect to the direction of rotation 128 of the drive shaft, disposed near the outer peripheral surface of the clutch plate 38 and a leading end disposed remotest from the clutch plate 38. An acute angle alpha, which each of the blades 126 makes with the direction of rotation 128 of the drive shaft 20, is 30 degrees, in this embodiment. As is readily seen from FIG. 3, the blades 126 and the dam elements 62 are mated with each other such that the trailing ends of the blades 126 are in registry with the axial wall portions 62B of the dam elements 62, respectively. It is also seen from FIG. 3 that the radial orifices 124 are separated from the pump inlet openings 60 by the adjacent two blades 126 and the mated axial wall portions 62B of the dam elements 62.

In order to establish fluid communication between the operating chamber 40 and the auxiliary reservoir 116, a plurality of openings, only one being shown at 130 in FIG. 1, are formed through the clutch plate 38 intermediate the inner edge of the ridge and groove elements 42 and 44 and the inner peripheral edge of the annular wall 110. In other words, these openings 130 are disposed radially inward of an imaginary circle, about the axis of rotation 20A of the drive shaft 20, to which a level 132 of the fluid when the fluid clutch 10 is at rest is tangent. With these openings 130, the pressure within the auxiliary reservoir 116 and that within the operating chamber 40 are balanced.

So long as the vehicle engine, not shown, is in operation, the drive shaft 20 and the associated clutch plate 38 will be driven at an appropriate speed ratio with respect to engine speed. Initially, the temperature responsive valve member 92 will be closed across the ports 68 and 88 in the divider wall 32, and will remain closed so long as the engine is cold, thus preventing any flow of fluid from the reservoir 54 into the operating chamber 40. Owing to the centrifugal force, the fluid remaining in the shear spaces between the ridge and groove elements 42 and 44 is forced to flow into the annular space 40A after having past the radial cutouts 61 and 45 and pump inlet openings 60 and the fluid within the auxiliary reservoir 116 is forced to flow into the annular passage 122 through the radial orifices 124. The fluid forced out of the radial orifices 124 is urged to flow toward the annular space 40A owing to the blades 126. The fluid collected in the annular space 40A is forced into the annular groove 58 out of the discharge cutouts 63 owing to the dam elements 62. Then, the fluid flows via the pump outlet passage 56 into the return passage 64 to fall via the return port 66 into the reservoir 54. Since the fluid flows quickly to the reservoir 54, no dragging of the housing 12 and thus the associated cooling fan take place.

As the ambient temperature increases due to the warmup of the radiator and engine, the bimetallic thermostatic valve control element 102 will begin to wind up and, since it is restrained at its outer end by the post 108, its inner end 104 will rotate the center pin 96 and the valve member 92, progressively uncovering the port 88 and then the port 68. As a result, fluid will flow back into the operating chamber 40 in a progressively increasing volume with increasing temperature.

When the valve member 92 uncovers the port 88 with the port 68 remain covered, the fluid flows through the port 88, opening 82, cavity 78, supply passage 76 and port 74 into the annular wide passage 72 of the ridge and groove elements 42 and 44. In this case, the fluid is supplied to shear spaces disposed radially outward of the annular wide passage 72 only.

As the valve member 92 uncovers the port 68, the fluid begins to flow into the operating chamber 40 radially inward of the ridge and groove elements 42 and 44, supplying the fluid to the shear spaces radially inward of the annular wide passage 72 too.

As the fluid is admitted to the operating chamber 40, filling the shear spaces between the ridge and groove elements 42 and 44, the shear-type fluid drive therebetween will be influenced and slip speed, or the difference in speed between that of the clutch plate 38 and the housing 12, will decrease. The pump will continue to promote circulation of fluid from the annular space 40A through the pump outlet passage 56 to the return passage 64 and then to the reservoir 54, from whence it will flow through the reservoir 54 and return to the operating chamber 40 via the variably opening ports 88 and 68.

When the cooling requirements are at a maximum, the temperature responsive valve member 92 rotates completely away from the ports 88 and 68, causing the relatively rotatable clutch plate 38 and the housing 12 to rotate at minimum slip speed and thereby effecting a maximum cooling function.

Immediately after the engine has ceased its operation, the fluid remaining in the operating chamber 40 starts to flow into the auxiliary reservoir 116 via one or some of the radial orifices 124 at a gradual rate, since the radial orifices 124 restrict the inflow of the fluid into the auxiliary reservoir 116.

For smooth and quick discharge of fluid from the auxiliary chamber 116, the radial orifices 124 should be disposed radially outermost with respect to axis of rotation 20A of the drive shaft 20.

Figure 4:
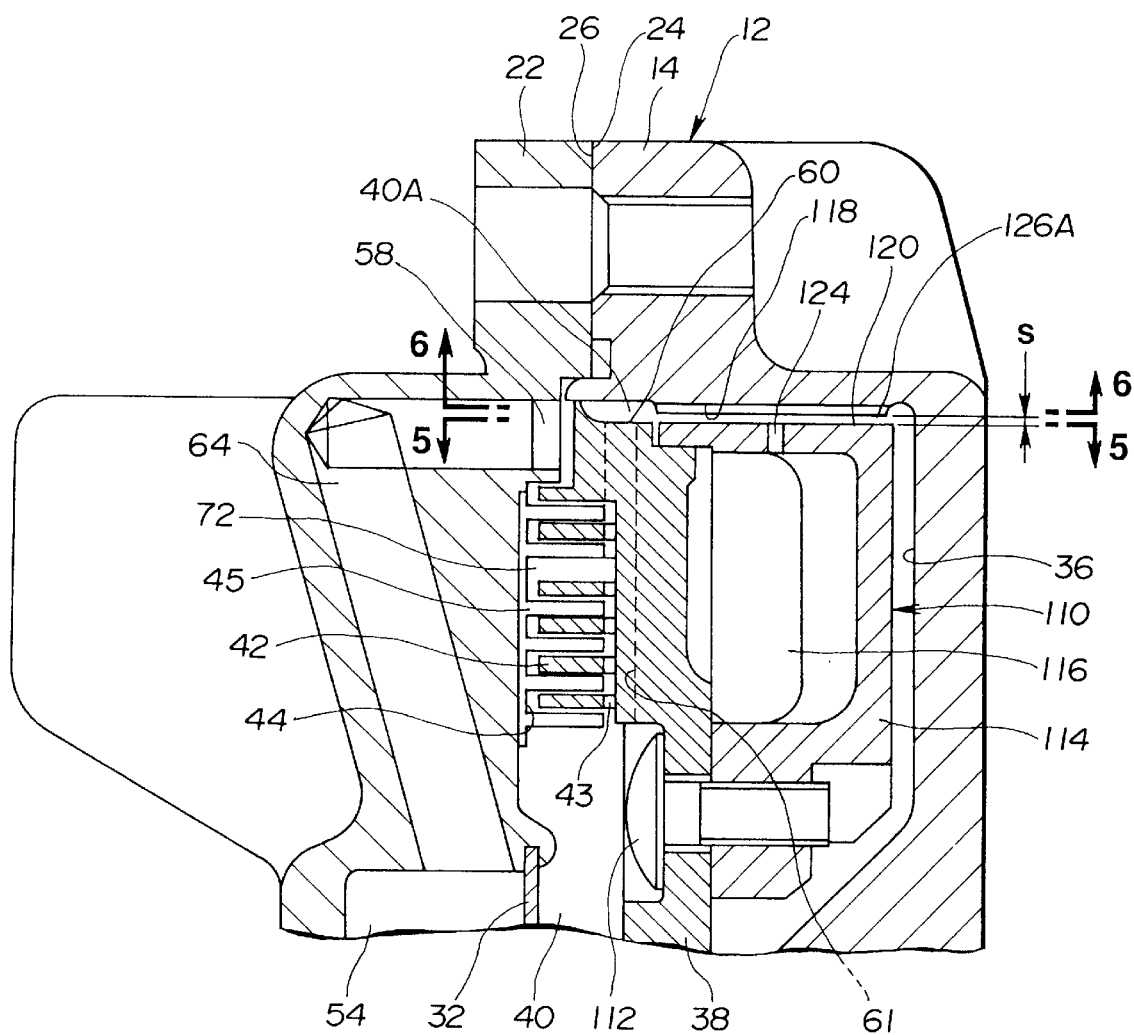
FIG. 4 is a view similar to FIG. 2 illustrating a second embodiment.
Figure 5:
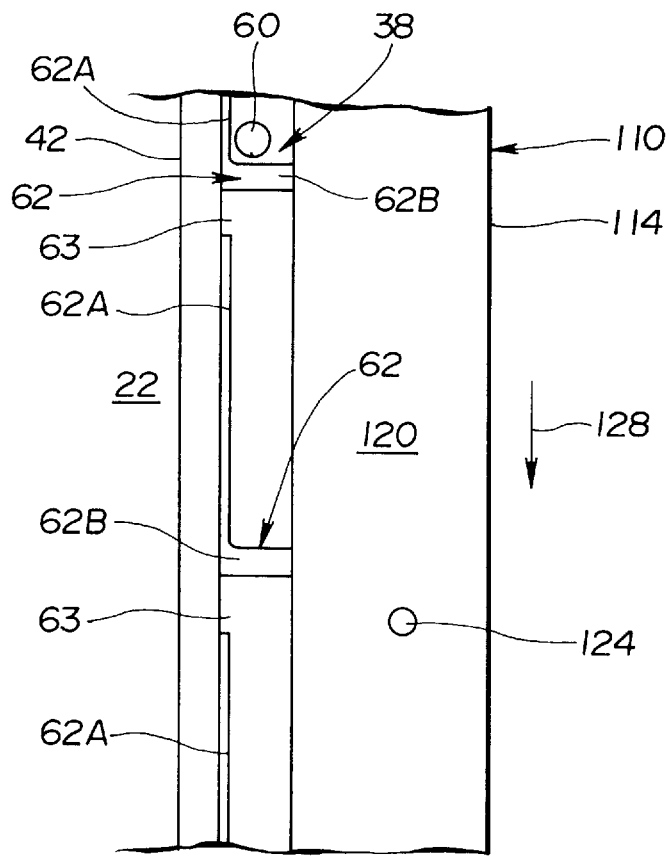
FIG. 5 is a fragmentary section through the line 5—5 of FIG. 3.
Figure 6:
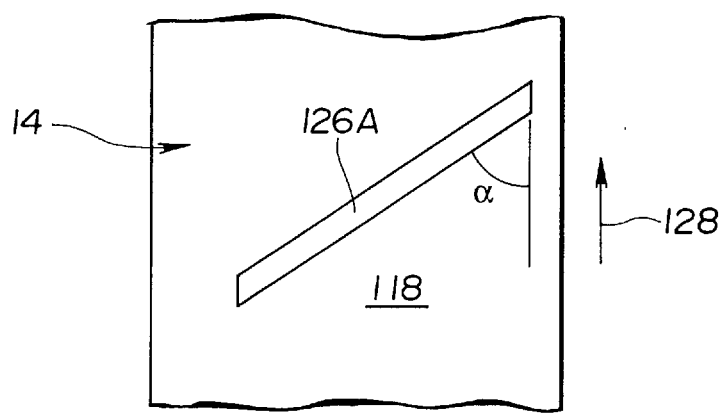
FIG. 6 is a fragmentary section through the line 6—6 of FIG. 3.

FIGS. 4, 5 and 6 show a second embodiment. This second embodiment is substantially the same as the first embodiment shown in FIGS. 1 to 3 except the arrangement of blades. In the second embodiment, a plurality of blades 126A are integrally formed on a cylindrical inner surface 118 of a rear wall 14. Each of the blades 126A is angled with respect to the direction of rotation 128 of a drive shaft 20 by an angle alpha so that fluid forced out of radial orifices 124 is urged to move toward an outer peripheral surface of a clutch plate 38.

In the above described embodiments, the number of blades 126 or 126A is eight, each of the projections forming the blades 126 or 126A extends along a straight line, and the angle alpha is 30 degrees. The present invention is not limited to them. The number of blades may be less than or greater than eight. The shape or configuration of each of the blades may take any suitable variants. The angle alpha may be less than or greater than 30 degrees.

What is claimed is:

1. A viscous fluid clutch, comprising:

first and second relatively rotatable drive members having an axis of rotation and rotatable in a predetermined direction about said axis, said first drive member having an operating chamber and a reservoir;

fluid shear drive means on said first and second drive members and located in said operating chamber, operable with viscous fluid, for providing a shear-type fluid drive between said first and second drive members, wherein:

said first drive member has a passage providing fluid communication between said operating chamber and said reservoir, said second drive member has wall means defining an auxiliary reservoir, said first drive member and said auxiliary reservoir define opposed spaced surfaces defining an annular passage that communicates with said operating chamber, said wall means has radial orifices that provide fluid communication between said auxiliary reservoir and said annular passage; and a plurality of blades formed on one of said opposed spaced surfaces defining said annular passage, and disposed in said annular passage, wherein each of said plurality of blades is angled with respect to said predetermined direction by a predetermined angle so that rotation of said second drive member in said predetermined direction causes said plurality of blades to urge viscous fluid out of said annular passage toward said operating chamber.

2. A viscous fluid clutch as claimed in claim 1, wherein said plurality of blades are in the form of protrusions rotatable with said second drive member, which is arranged circumferentially and angled with respect to said predetermined direction at said predetermined angle.

3. A viscous fluid clutch as claimed in claim 1, wherein said second drive member includes a drive shaft, wherein said first drive member includes a housing rotatably mounted to said drive shaft, said housing including said reservoir, said operating chamber and said pump outlet providing communication between said operating chamber and said reservoir, and wherein said second drive member includes a clutch plate attached to said drive shaft and disposed in said operating chamber.

4. A viscous fluid clutch as claimed in claim 3, wherein said second drive member includes an annular wall secured at inner and outer peripheral edges thereof to said clutch plate, said annular wall including an annular bend between said outer and inner periphral edges thereof to define an annular auxiliary reservoir in cooperation with said clutch plate.

5. A viscous fluid clutch as claimed in claim 4, wherein said housing has an annular recess accommodating said annular bend and including a cylindrical inner surface partly defining said annular recess, and wherein said cylindrical surface and the opposed surface of said annular bend defines therebetween said passage communicating with said operating chamber.

6. A viscous fluid clutch as claimed in claim 5, further including circumferentially distant dam elements arranged on an outer peripheral surface of said clutch plate, said dam elements including circumferential wall portions and axial wall portions, said circumferential wall portions being spaced one after another to define a plurality of discharge openings, and wherein said plurality of blades are in the form of protrusions arranged in registry with said axial wall portions, respectively.

7. A viscous fluid clutch as claimed in claim 2, wherein said predetermined angle is substantially less than 90 degrees.

8. A viscous fluid clutch as claimed in claim 2, wherein said predetermined angle is about 30 degrees.

* * * * *